United States Patent [19]

Koide

[11] Patent Number: 4,591,767
[45] Date of Patent: May 27, 1986

[54] CONTROL SYSTEM FOR RECIPROCATING DRIVE MOTOR

[75] Inventor: Hiroshi Koide, Tokyo, Japan

[73] Assignee: Ricoh Company, Ltd., Tokyo, Japan

[21] Appl. No.: 728,373

[22] Filed: Apr. 29, 1985

Related U.S. Application Data

[63] Continuation of Ser. No. 346,889, Feb. 8, 1982, abandoned.

[30] Foreign Application Priority Data

| Feb. 12, 1981 | [JP] | Japan | 56-19537 |
| May 20, 1981 | [JP] | Japan | 56-74816 |
| Jul. 17, 1981 | [JP] | Japan | 56-110667 |

[51] Int. Cl.$^4$ .............................................. H02P 5/00
[52] U.S. Cl. ................................ 318/314; 318/327; 318/341; 318/599
[58] Field of Search ............... 318/264, 314, 317, 318, 318/326, 327, 332, 341, 345 R, 345 A, 393, 398, 397, 430, 431, 464, 591, 599, 600, 601, 602, 603, 604, 605, 606, 607, 608, 615, 616, 617, 618, 628

[56] References Cited

U.S. PATENT DOCUMENTS

| 3,560,827 | 2/1971 | Schiller | 318/616 X |
| 3,617,844 | 11/1971 | Grygera | 318/327 X |
| 3,737,751 | 6/1973 | Lima | 318/341 X |
| 3,783,360 | 1/1974 | Bundy | 318/341 X |
| 3,836,833 | 9/1974 | Harris et al. | 318/270 |
| 3,934,269 | 1/1976 | Fujita et al. | 318/327 X |
| 3,983,464 | 9/1976 | Peterson | 318/327 |
| 4,052,646 | 10/1977 | Massey et al. | 318/341 X |
| 4,259,627 | 3/1981 | Matsuno et al. | 318/600 |
| 4,268,782 | 5/1981 | Kawada et al. | 318/332 X |
| 4,278,923 | 7/1981 | Nowak et al. | 318/326 X |
| 4,301,395 | 11/1981 | Furuhata et al. | 318/314 |
| 4,441,061 | 4/1984 | Yoshida et al. | 318/601 X |
| 4,480,215 | 10/1984 | Bax | 318/314 X |

Primary Examiner—Bernard Roskoski
Assistant Examiner—Shik Luen Paul Ip
Attorney, Agent, or Firm—David G. Alexander

[57] ABSTRACT

A control system for a reciprocating drive motor includes a phase comparator which determines a difference in phase between pulses synchronous with the rotation of a motor and reference pulses whose period corresponds to a specified velocity, to produce a pulse while any phase difference exists and in accordance with the advancement/retardation of the phase. A charge pump circuit is connected between the phase comparator and a loop filter of the control system to produce a voltage which is zero level when the phase difference is zero, and positive (negative) or negative (positive) with respect to the zero level in accordance with the advancement/retardation of the phase. Until the motor enters a constant velocity control mode, the output of the loop filter is maintained zero level by switching means. In a constant velocity control mode, while the phase difference is zero (meaning that the motor is in rotation at a specified velocity), the output voltages of the charge pump and loop filter are kept zero level regardless of the specified velocity. When the operation mode shifts from a start mode to a constant velocity control mode, the output voltage of the loop filter is held zero level regardless of the specified velocity. The control system further includes compensation voltage supply means for energizing the motor with a current large enough to overcome frictional forces of a system which is driven by the motor.

6 Claims, 29 Drawing Figures

| Fig. 1a | Fig. 1b | Fig. 1c |

Fig. 8
PRIOR ART
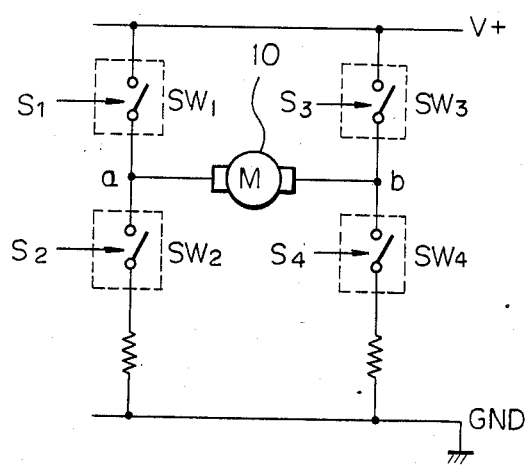
Fig. 9a $S_1, S_4$
PRIOR ART
Fig. 9b $S_2, S_3$
PRIOR ART
Fig. 9c $SW_1, SW_4$
PRIOR ART
Fig. 9d $SW_2, SW_3$
PRIOR ART
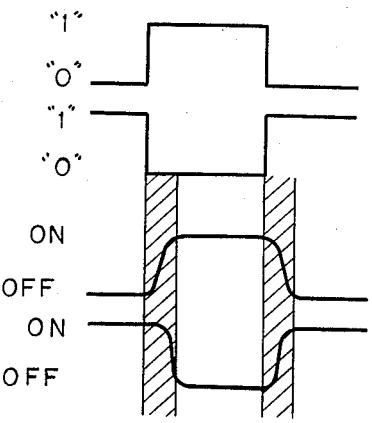

Fig.11a  Vo  
Fig.11b  |Vo|  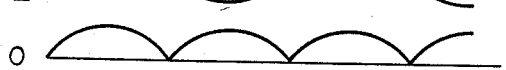
Fig.11c  $CP_0$  
Fig.11d  $OS_1$  
Fig.11e  $OS_2$  
Fig.11f  $OR_0$  
Fig.11g  $IN_0$  
Fig.13
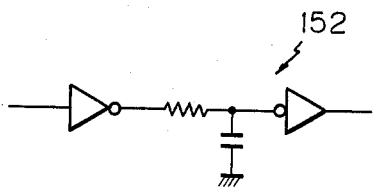

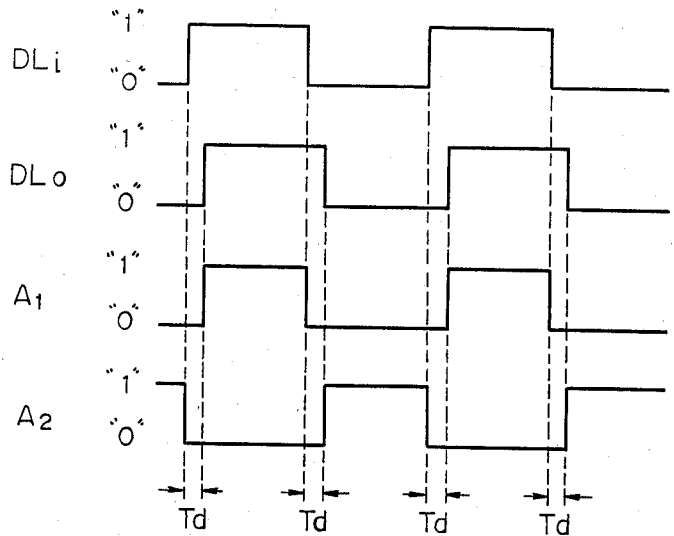
Fig.14a DLi
Fig.14b DLo
Fig.14c A₁
Fig.14d A₂
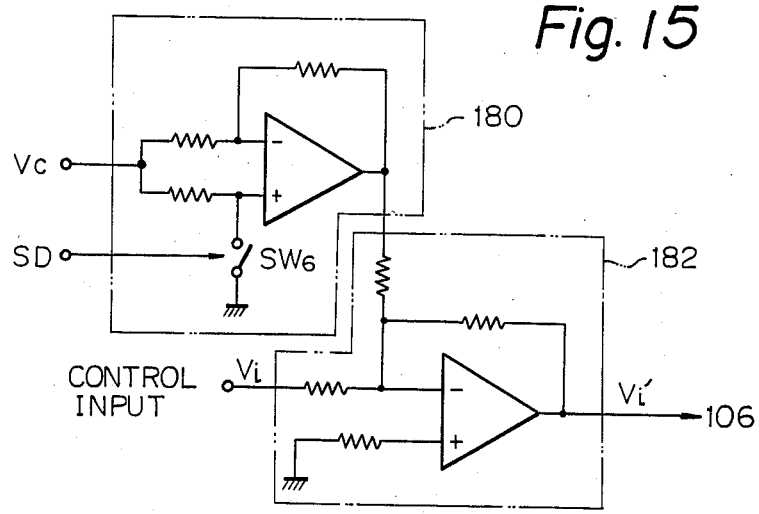
Fig. 15

CONTROL SYSTEM FOR RECIPROCATING DRIVE MOTOR

CROSS REFERENCE TO RELATED APPLICATION

This application is a continuation of copending U.S. patent application Ser. No. 346,889, filed Feb. 8, 1982 now abandoned.

BACKGROUND OF THE INVENTION

The present invention relates to a control system for a motor adapted to drive for repeated reciprocation a carriage of a copying apparatus carrying a lamp, mirrors etc., a scanning head of a facsimile apparatus, a recording head of a printer or like movable body.

In a control of a motor of the type described, it is desirable that the motor settles at a constant velocity as quickly as possible after a start of its movement. A motor drive control system heretofore known is designed to perform a constant velocity control employing a phased locked loop or PLL. The phase locked loop control system usually comprises a rotary encoder connected with a motor, a phase comparator, a loop filter and a motor drive circuit which includes a servo amplifier. However, such a control system requires a substantial period of time for the motor to enter a constant velocity control mode from a standstill or from an instant of reversal. This originates from the fact that due to the presence of the loop filter a time period corresponding to the time constant of the loop filter is necessary before the motor enters a constant velocity movement. It has been customary to overcome this drawback by supplying a given level of voltage to the motor drive circuit as an energizing signal at a start of motor operation while, during this period of time, charging the loop filter so that its output voltage reaches a constant velocity indication level for a constant velocity control (as disclosed in Japanese Layed Open Patent Application No. 54-35312/1979). As the motor is accelerated up to a predetermined velocity or as a predetermined energizing time for a start of the motor expires, the loop filter is discharged to switchingly supply the motor drive circuit with its output voltage. This type of prior art control system is advantageous in that the time period the motor takes to reach a predetermined velocity is short, in that the motor can enter the constant velocity control mode without any substantial hunting, and in that the buildup time necessary for the motor to settle in the constant velocity mode after a start is short.

However, the prior art control system described above cannot avoid intricacy of construction. For instance, where a plurality of motor velocities can be specified, that is, where pulses synchronous with actual rotation of a motor are to be compared with reference pulses having a period which corresponds to a specific motor velocity, the voltage at the loop filter must reach a level corresponding to the specific motor velocity before the motor enters a constant velocity control mode. The control system therefore needs initial voltage setting circuits equal in number to the designatable steps of motor velocity and installed in the loop filter section or its input section or between the loop filter and the motor drive circuit, and a selector circuit for selecting one of the initial voltage setting circuits each time.

Meanwhile, where the frictional forces in a scanning mechanism driven by the motor are relatively large (and/or the loop gain is relatively small), the motor has to exert a large torque. If an arrangement is made such that a current larger than a certain value can be fed to the motor in a constant velocity control mode, the phase difference will be stabilized at a value corresponding to the frictional forces while the output voltage of the loop filter will settle at a given level on the motor accelerating side with respect to the zero level. However, a problem is that the motor is decelerated temporarily upon a shift from a start mode to a constant velocity control mode and, then, accelerated until the output of the loop filter reaches the given level on the motor accelerating side, which results in a temporary oscillation of the motor and, therefore, the scanning mechanism.

SUMMARY OF THE INVENTION

In accordance with the present invention, a control system for a reciprocating drive motor comprises a loop filter, a phase comparator which discriminates a difference in phase between reference pulses of a period corresponding to a specified velocity and pulses synchronous with actual rotation of a motor and, while any phase difference exists, produces pulses each having a predetermined level in dependence on the phase retardation/advancement. Interposed between the loop filter and the phase comparator is a charge pump circuit which generates a voltage of zero level when the phase difference is zero, a positive (negative) voltage when the phase is advanced and a negative (positive) voltage when the phase is retarded. The output voltage of the loop filter is held at the zero level by switching means until the motor enters a constant velocity control mode. When in a constant velocity control mode the phase difference is zero (when the motor is rotating at a specified speed), the output voltage of the charge pump circuit and that of the loop filter are made zero level regardless of the specified speed; when the operation shifts from a start mode to a constant velocity control mode, the output voltage of the loop filter is made zero level regardless of the specified velocity. Further, the control system includes compensating voltage supply means which in a constant velocity control mode supplies the motor with a current large enough to overcome frictional forces of a system driven by the motor.

It is an object of the present invention to provide a control system for a reciprocating drive motor control system which can quickly shift itself from a start mode to a constant velocity control mode with no regard to a specified velocity.

It is another object of the present invention to provide a control system for a reciprocating drive motor which can stably shift itself from a start mode to a constant velocity control mode regardless of a specified velocity.

It is another object of the present invention to provide an improved servo amplifier circuit which constitutes a motor drive circuit.

It is another object of the present invention to provide a generally improved control system for a reciprocating drive motor.

Other objects, together with the foregoing, are attained in the embodiments described in the following description and illustrated in the accompanying drawings.

BRIEF DESCRIPTION OF THE DRAWINGS

FIG. 8 is a diagram showing a bridge connection of four switching circuits used for a current source bridge type servo amplifier circuit which is applicable to the control system of FIG. 1;

FIGS. 9a–9d show waveforms explanatory of retardation in the on-off operations of the switching circuits indicated in FIG. 8;

FIGS. 11a–11g show signal waveforms representing an operation of a circuit associated with the prior art current source bridge type servo amplifier circuit to prevent a short mode thereof;

FIG. 13 shows an example of a delay circuit included in the circuit of FIG. 12;

FIGS. 14a–14d show signal waveforms explanatory of an operation of a circuit associated with the circuit of FIG. 12 to prevent a short mode thereof; and FIG. 15 shows an example of a circuit for adding a predetermined bias voltage to a control signal.

DESCRIPTION OF THE PREFERRED EMBODIMENTS

While the control system for a reciprocating drive motor of the present invention is susceptible of numerous physical embodiments, depending upon the environment and requirements of use, substantial numbers of the herein shown and described embodiments have been made, tested and used, and all have performed in an eminently satisfactory manner.

Figures 1, 1A:
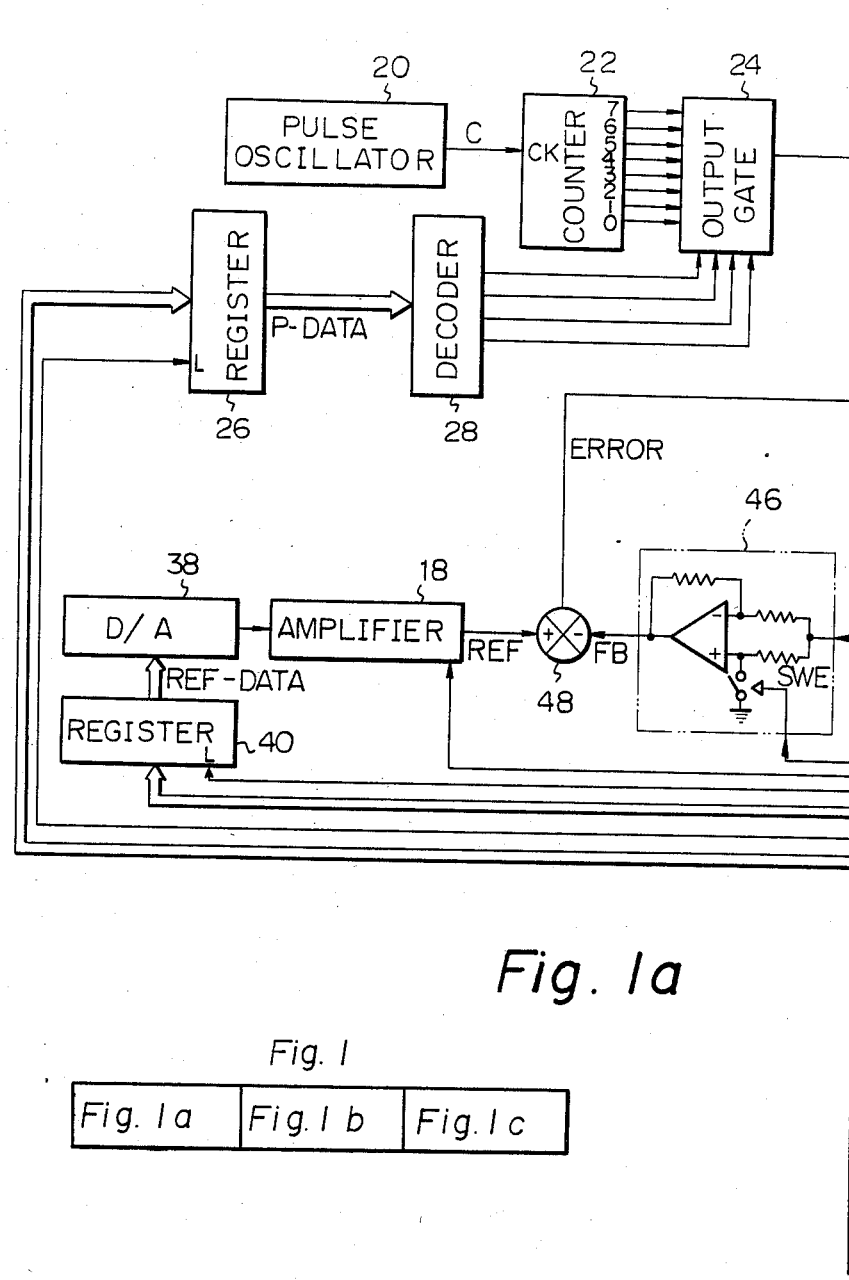
FIG. 1 is illustrative of how
FIGS. 1a to 1c are combined to constitute a block diagram of a reciprocating drive motor control system embodying the present invention.
Figure 1B:
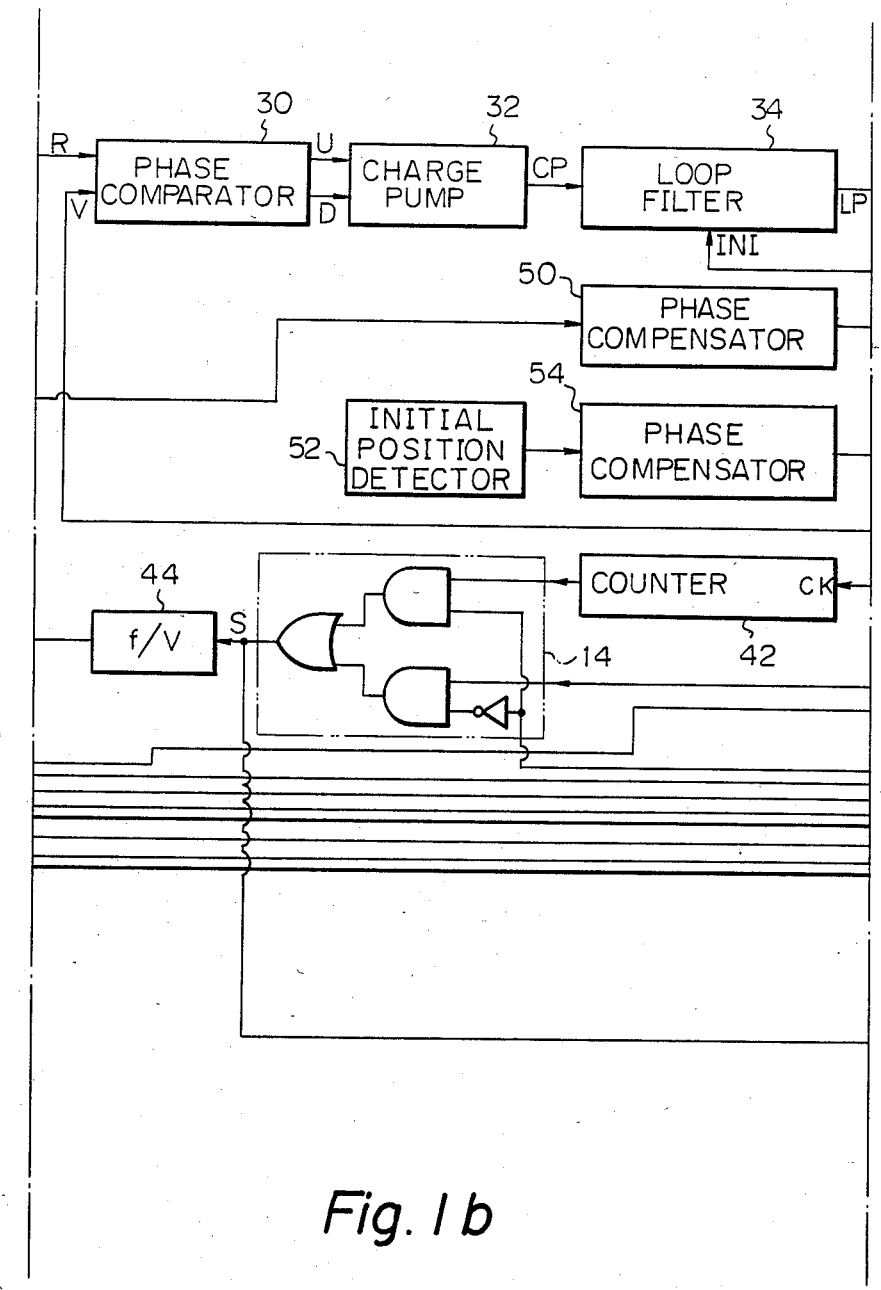
Figure 1C:
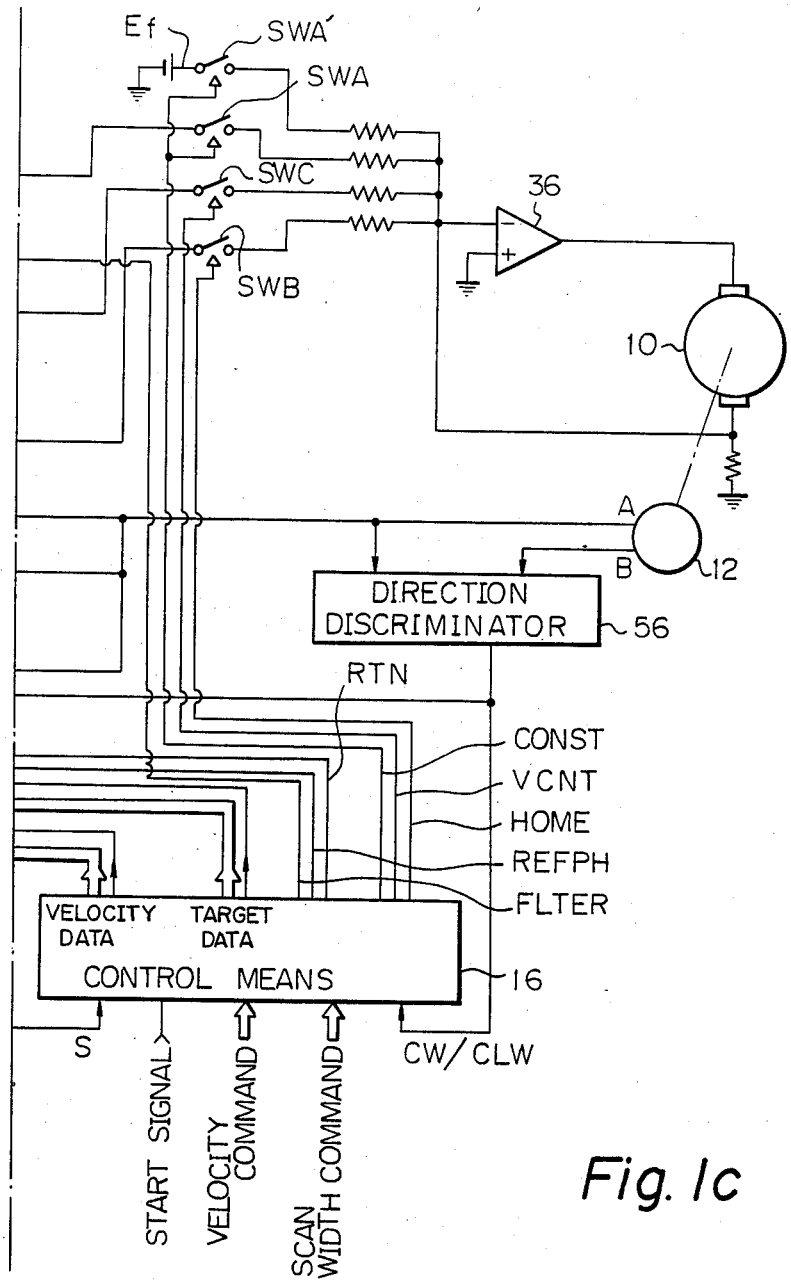

Referring to FIGS. 1a to 1c of the drawings, the control system controls a motor 10 adapted to reciprocate a carriage of a copying machine, for example, which carries a lamp and mirrors thereon as usual. The carriage has a home position ahead of an exposing region with respect to its direction of forward or scan stroke. As will be described in detail, a photosensor of an initial position detecting unit is located in the home position. The carriage is driven by the motor 10 for a forward stroke to the exposing region starting from its home position while, during this period of time, a rotary encoder 12 connected with the motor 10 produces pulses A. These output pulses A of the rotary encoder 12, or output pulses S of a multiplexer 14 in a strict sense, are successively counted by a control unit 16. As the forward movement reaches a predetermined width or stroke, the carriage is driven for a backward or return stroke beyond the home position. During such a reciprocation of the carriage, the control unit 16 selectively opens and closes switches SWA', SWA, SWB, SWC, SWD (see FIG. 2 for the switch SWD) while switching the output polarity of an amplifier 18, which is selectively operable in inverting and non-inverting modes.

The control system comprises a phase locked loop or PLL feedback control network which is made up of a specified velocity latching and reference pulse generating device constituted by a pulse oscillator 20, a counter 22, an output gate 24, a register 26 and a decoder 28; a switching circuit made up of a phase comparator 30, a charge pump circuit 32, a loop filter 34 and switches SWA', SWA-SWC; a servo amplifier 36; and the rotary encoder 12. The control system also comprises an analog feedback control network consisting of a specified velocity latching and analog target value generating circuit constituted by the amplifier 18, a digital-to-analog converter 38 and a register 40; a digital processing analog feedback circuit constituted by a frequency dividing counter 42, the multiplexer 14, a frequency-to-voltage converter 44 and an inverting/non-inverting amplifier 46; a differential amplifier 48; and a phase compensation circuit 50. These PLL feedback control network and analog feedback control network are selectively connected to the servo amplifier 36 by the switching circuit SWA', SWA-SWC. The control system further comprises a home position drive control network which is made up of an initial position detecting unit 52 with the photosensor and a phase compensation circuit 54. The home position drive control network is also selectively connected to the servo amplifier 36 via the switching circuit so that the motor 10 is actuated to advance the carriage to the home position from an end-of-return position.

In the PLL feedback control network, the register 26 latches data which specifies a velocity. The decoder 28 transforms the output data of the register 26 into a count output selection signal which is coupled to the output gate 24. The counter 22 counts output pulses of the pulse oscillator 20 (pulses C) to produce at its "0" output terminal a train of pulses whose period is half that of the pulses C and a duty is 50%, at its "1" output terminal a train of pulses whose period is four times that of the pulses C, and at its "2" output terminal a train of pulses whose period is eight times that of the pulses C; that is, at its "i" output terminal a train of pulses whose period is "$2^{i+1}$" times that of the pulses C. The output gate 24 supplies the phase comparator 30 with pulses appearing at one of the output terminals of the counter 22 specified by a selection output of the decoder 28, said pulses serving as velocity reference pulses R. Alternatively, the counter 22 may comprise a presettable decrement counter which is so arranged as to receive a borrow signal at a preset terminal and an output of the register 26 at a preset input terminal. With this alternative arrangement, the output gate 24 and decoder 28 can be omitted.

Figure 2:
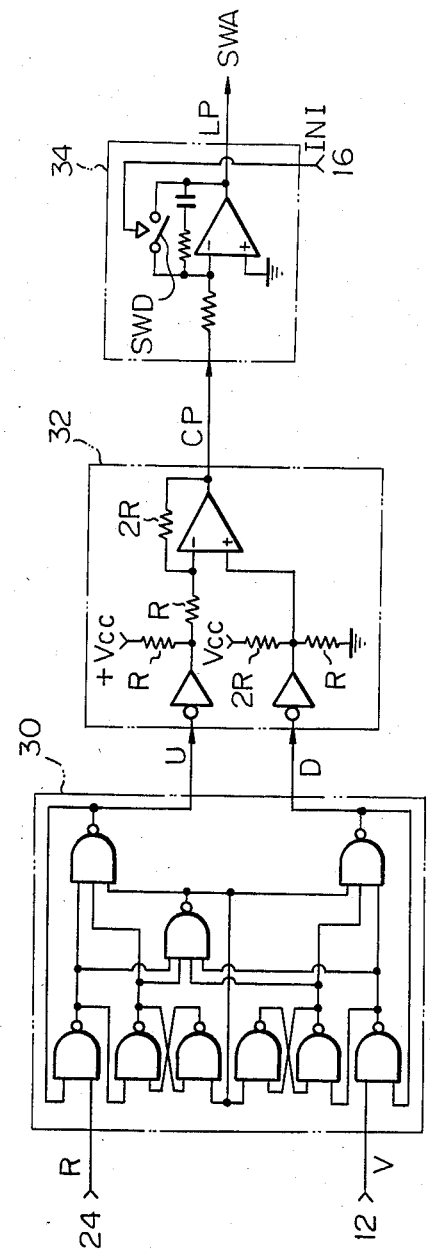
FIG. 2 is a detailed circuit diagram of a part of the control system shown in FIG. 1.
Figure 3:
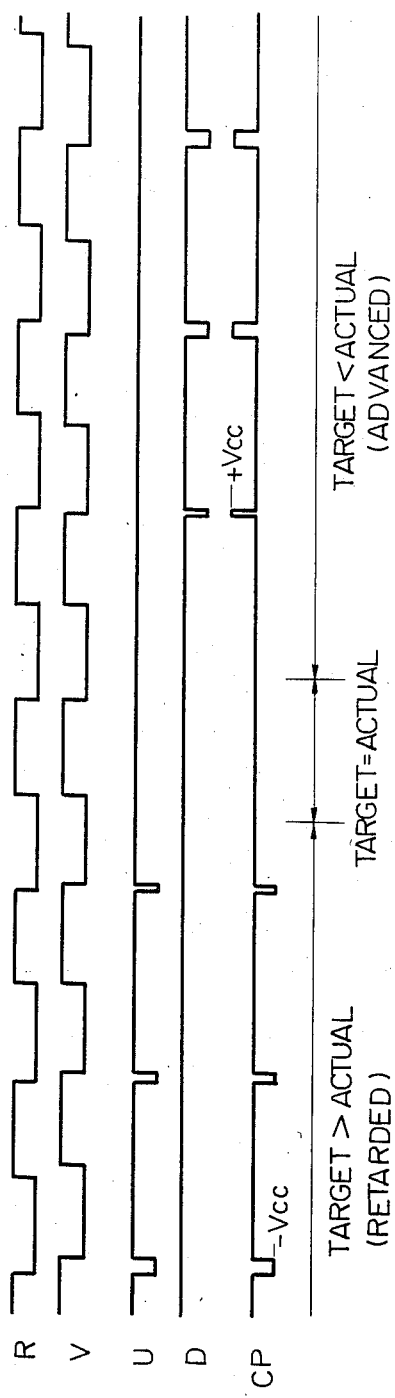
FIG. 3 is a timing chart showing inputs and outputs of a phase comparator and a charge pump circuit.

The phase comparator 30 is also supplied with output pulses A of the rotary encoder 12 as pulses V which are synchronous with the rotation of the motor 10. Details of the phase comparator 30, charge pump 32 and loop filter 34 are shown in FIG. 2, while inputs and outputs of the comparator 30 and charge pump 32 are shown in FIG. 3. As seen in FIG. 3, if the phase of the pulses V synchronous with the motor rotation is retarded relative to that of the reference pulses R, the phase comparator 30 produces a low level pulse U for a duration equal to the amount of retardation. Conversely, if the phase of the pulses V is advanced relative to that of the reference pulses R, the phase comparator 30 produces a low level pulse D having a duration equal to a specific amount of advancement. The charge pump 32 is constructed to produce a constant negative level voltage $-V_{cc}$ while the pulse U is low level, a constant positive level voltage $+V_{cc}$ while the pulse D is low level, and a zero level voltage while both the pulses U and D are high level. Stated another way, the output of the charge pump 32 is zero level in the case of zero phase deviation but becomes positive or negative in the case of phase deviation in the retarding or advancing direction. The loop filter 34 integrates an output voltage of the charge pump 32; the integrated voltage remains zero level while a switch SWD which is an additional element for practicing the invention is closed. While the switch SWD is open, a voltage LP given by integrating an output CP of the charge pump 32 is fed from the loop filter 34 to the switch SWA. This output voltage LP will be coupled to the servo amplifier 36 when the switch SWA is closed. In a constant velocity control mode, as will be described, the control 16 closes the switches SWA', SWA, SWC so that the servo amplifier 36 is supplied with three different voltages superposed one upon another or added to each other: a voltage Ef indicating a bias voltage for generating a torque large enough to overcome frictional forces, a PLL control voltage LP and an analog feedback control voltage or error signal ERROR. Accordingly, the output LP of the loop filter 34 increases the motor current if the pulses V are retarded in phase relative to the reference pulses R, decreases it if the pulses V are advanced, and keeps it the same if the pulses V are identical in phase with the pulses R.

The analog feedback control network has the following construction and arrangement. In this embodiment, the carriage is driven for a return strike at a high speed by the analog feedback control network only. The rotary encoder 12 produces pulses A and B synchronous with the rotation of the motor 10 and different in phase by $\pi/2$ from each other. These pulses A and B are fed to a clockwise/counterclockwise discrimination circuit 56 which discriminates a rotating direction of the motor 10 from a phase difference between the pulses A and B. The direction discriminator 56 produces a direction signal CW/CLW which is logical "0" or low level when the rotation of the motor 10 is forward or clockwise but logical "1" or high when it is reverse or counterclockwise. The direction signal CW/CLW is passed to the amplifier 46 and control unit 16. Prior to a forward or scan stroke of the carriage, the control 16 latches velocity specifying data in the registers 26 and 40, conditions the amplifier 18 for a positive output, and commands the multiplexer 14 to produce the pulses A. Upon a forward rotation of the motor 10, the direction discriminator 56 supplies the amplifier 46 with a low level signal CW/CLW thereby opening a switch SWE thereof. As a result, an analog voltage or target velocity signal (positive) corresponding to the velocity specifying data is coupled from the amplifier 18 to the positive input terminal of the differential amplifier 48; a frequency-to-voltage converted voltage or velocity feedback signal prepared by the frequency-to-voltage converter 44 from the pulses A is supplied with the positive polarity from the amplifier 46 to the negative input terminal of the differential amplifier 48; and a signal indicating a difference between the target velocity signal and the velocity feedback signal is applied from the differential amplifier 48 to the phase compensator 50 as an error signal ERROR. The phase compensator 50 comprises a known advance-retard circuit which suppresses overshooting of the carriage in a buildup stage of the latter. The phase compensator 50 feeds a composite control voltage of an error signal ERROR and an overshoot compensating component to the servo amplifier 36 via the switch SWC. The control 16 is supplied in advance with data indicating a specific scanning width to determine a position where a forward stroke of the carriage should be stopped and replaced by a return stroke. For this purpose, the control 16 replaces the data in the register 40 with progressively decreasing ones at predetermined timings before the carriage reaches the stop position. As such is achieved by counting the pulses A starting from the home position and using the counts to determine the timings. The carriage is thus sharply decelerated as it approaches the stop position. When the count of the pulses A coincides with the number corresponding to the specified scanning width, the control 16 conditions the amplifier 18 for a negative output (supply of a high level or logical "1" output), feed a logical "1" control signal to the multiplexer 14 to cause it into a frequency divided count pulse output mode, and latches return velocity data in the register 40. The current now flows through the motor 10 in the opposite direction driving the motor 10 reversely. Then, the output signal CW/CLW of the direction discriminator 56 becomes logical "1" whereby the switch SWE of the amplifier 46 is closed to produce a negative output. In such a return drive, the frequency divided version of the pulses A (output of the counter 42) is fed to the frequency-to-voltage converter 44 so that, supposing that the target velocity signal is at the same level as that for the preceding forward stroke, the return velocity is "n" times the forward velocity (where n is the period of output pulses of the frequency dividing counter 42 divided by the period of the pulses A). The return velocity may naturally be determined by the data latched in the register 40 during a return stroke. In any case, since the return velocity is higher than the scan velocity, it is difficult for the control 16 to count the pulses A and perform a timing control based on the count of the pulses A in the course of a return drive. To overcome this difficulty, in a return drive the control 16 counts frequency divided pulses and controls the timings based on the count thereof. In detail, the control 16 obtains a return width from a scan width to set an end-of-return position past of the home position and replaces the data in the register 40 with progressively decreasing ones.

Now, the controls for a scan stroke and a return stroke of the carriage will be described concentrating chiefly on the operation of the control 16. Various operating timings are outlined in Table 1.

When the power source is turned on, the control 16 closes the switches SWB, SWD while opening the other switches. The servo amplifier 36 is therefore supplied only with the output of the phase compensator 54. Constructed in the same way as the phase compensator 50, the phase compensator 54 produces an output which has a predetermined positive level as long as the photosensor of the initial position detector 52 does not detect the carriage, but drops to the zero level upon detection of the carriage.

TABLE 1

| | POWER ON | SCAN STROKE BUILDUP | SCAN STROKE CONSTANT VELOCITY | SCAN STROKE STOP | RETURN STROKE | RETURN STROKE STOP | STAND-BY | SCAN STROKE BUILD-UP | SCAN STROKE CONSTANT VELOCITY |
|---|---|---|---|---|---|---|---|---|---|
| SWA" | Open | Open (Close) | Close | Open | Open | Open | Open | Open (Close) | Close |
| SWA | Open | Open | Close | Open | Open | Open | Open | Open | Close |
| SWB | Close | Open | Open | Open | Open | Open | Close | Open | Open |
| SWC | Open | Close | Close | Close | Close | Close | Open | Close | Close |
| SWD | Close | Close | Open | Close | Close | Close | Close | Close | Open |
| 14 OUTPUT | | Pulse A | Pulse A | Pulse A | 42 Output | 42 Output | | Pulse A | Pulse A |
| 18 OUTPUT | | + | + | + | − | − | | + | + |

↑ Start Signal (at buildup columns)

Thus if the carriage is dislocated from the home position in the returning direction, the motor 10 will be driven forwardly until the carriage regains the home position. If the carriage is dislocated from the home position in the scanning direction, the motor 10 will be driven forwardly so that the carriage is moved in the scanning direction to close a limit switch (not shown) in the vicinity of a limit position. In response to this, the control 16 conditions the various switches for a return operation mode which is outlined in Table 1 and will be later discussed. In the return operation mode, the movement of the carriage is stopped at a position slightly past of the home position whereupon the operation mode is switched to a standby mode as when the power source has been turned on. In the standby mode, the motor 10 is driven forwardly by an output of the phase compensator 54 to locate the carriage in the home position. Comprising a microcomputer or like LSI, the control 16 in response to a start signal holds velocity indication data and scanning width indication data supplied thereto from the outside, loads the velocity data in the registers 40 and 26, transforms the scanning width data into a scan width count (count of pulses A), sets the switches to the scan stroke buildup mode shown in Table 1, and starts counting output pulses of the multiplexer 14. In the buildup stage of a scan stroke, the servo amplifier 36 is supplied with a composite signal of an output of the differential amplifier 48 and a phase compensating component, whereby the motor 10 is subjected to an analog feedback velocity control with its overshooting suppressed. The switch SWD of the loop filter 34 is closed setting the integrated output of the loop filter 34 at the zero level. At this instant, the switch SWA' may be closed to feed to the motor a predetermined current large enough to overcome frictional forces. As the output pulses of the multiplexer 14 (pulses A) reach a predetermined count, the control 16 alters the conditions of the switches to a constant velocity control mode. In this control node, the switch SWD of the loop filter 34 is opened so that the servo motor 10 is supplied with the combined PLL control signal LP, friction compensation signal Ef and analog feedback error signal ERROR. During this mode of operation, the actual motor velocity is substantially equal to the target velocity and, therefore, the level of the analog feedback error signal is low, that is, the PLL control signal LP has a major weight; which permits a subtle velocity control by matching the pulses A (V) in phase with the reference pulses R. Since the integrated output of the loop filter 34 has been set at the zero level at the time of phase coincidence by the switch SWD, and since the actual motor velocity approximated to the target velocity during the buildup control, the phase can be locked as soon as the control mode is switched from the buildup control to the constant velocity control, thereby accurately stabilizing the actual velocity at the target velocity.

When the value corresponding to the scan width data is reached by the count of the pulses, the control 16 conditions the various switches for a scan stroke stop mode shown in Table 1 and, timed to the varying count of the pulses A, successively replaces the data in the register 40 with smaller one (scan stroke stop control mode). Next, the control 16 alters the conditions of the switches to a return mode of Table 1, re-loads the register 40 with the data loaded at the start of the previous scan stroke, and counts output pulses of the multiplexer 14 (output pulses of the counter 42) specifying a return width which is $1/n + \alpha$ of the scan width, where $\alpha$ corresponds to a width which the carriage moves past the home position (calculated from output pulses of the counter 42). As the remaining distance of the return stroke reaches predetermined one, the control 16 successively alters the data in the register 40 with smaller one (return stop mode) and then conditions the switches for the standby mode of Table 1. At this moment, the carriage has moved past the home position so that the switch from the return to the standby mode causes the motor 10 to be driven forwardly by an output (positive) of the phase compensator 54. When the carriage arrives at the position of the photosensor of the initial position detector 52 (home position), the output of the phase compensator 54 drops to the zero level to stop the operation of the motor 10.

In the embodiment described hereinabove, the analog feedback control is employed to assist the PLL motor control in speeding up the buildup at a start of motor operation. The analog feedback network also joins a constant velocity control in order to stabilize the control system. It will be seen, however, that the constant velocity control essentially relies on the PLL control in view of the fact that the analog feedback error signal near the target velocity is approximate to the zero level.

In a PLL constant velocity control using a charge pump circuit, full synchronization drops the output level of the loop filter down to zero. With this in view, the embodiment described sets the integrated voltage of the loop filter at zero before a constant velocity control is initiated, which eliminates the need of a change in the preset output voltage of the loop filter despite any change in the target velocity and, therefore, the need of a voltage setting circuit for each specified velocity, while unnecessitating a selector for designating a specific voltage setting circuit.

Hereinafter will be described some examples of the servo amplifier 36 which is employed in the motor control system described above as a motor drive circuit.

Figure 4:
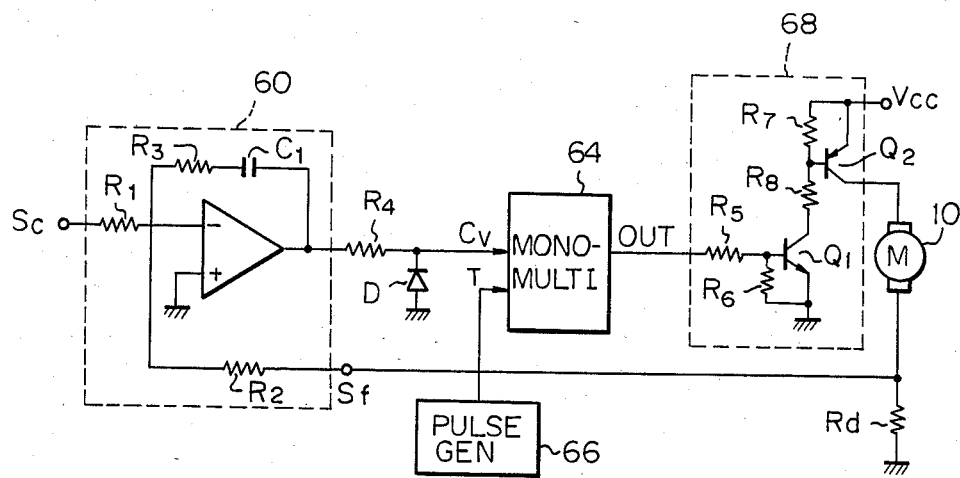
FIG. 4 shows an example of a switching type servo amplifier circuit included in the control system of FIG. 1.

Referring to FIG. 4, a switching type servo amplifier circuit is shown which uses a variable sweeping time monostable multivibrator for the control of a current or voltage supplied to the motor through pulse width modulation. The servo amplifier circuit of FIG. 4 includes an initial stage servo amplifier 60 which is made up of an operational amplifier 62, input resistances $R_1$, $R_2$, and a series connection of a resistor $R_3$ and a capacitor $C_1$ which is disposed in the feedback circuit. The servo amplifier 60, which is thus of an integration type, is supplied via the resistor $R_1$ with a servo amplifier control signal Sc which is a negative voltage and, via the resistor $R_2$, a feedback signal Sf which is a positive voltage across a resistor $R_d$ adapted to detect a current flowing through the motor 10. Therefore, the output of the servo amplifier 60 represents a difference between the two input voltages. This output voltage of the servo amplifier 60 is coupled as a control voltage CV to a monostable multivibrator 64 via a resistor $R_4$, controlling the sweeping time of the latter. If the output voltage of the servo amplifier 60 is negative, it will be cut by a diode D.

The monostable multivibrator 64 is triggered by a pulse signal T produced from a pulse oscillator 66 at a predetermined period, so that its output OUT remains high level or "H" for a sweeping time corresponding to the control voltage CV.

A switching circuit 68 comprises transistors $Q_1$, $Q_2$ and resistors $R_5$–$R_8$. Only when the output of the monostable multivibrator 64 is high level or "H", the transistor $Q_1$ is turned on to turn on the transistor $Q_2$. Accordingly, the output voltage of the servo amplifier 60 modulates an output of the monostable multivibrator 64 with respect to the pulse width and, thereby, controls the current supplied to the motor 62 through the switching circuit 68.

Figure 5:
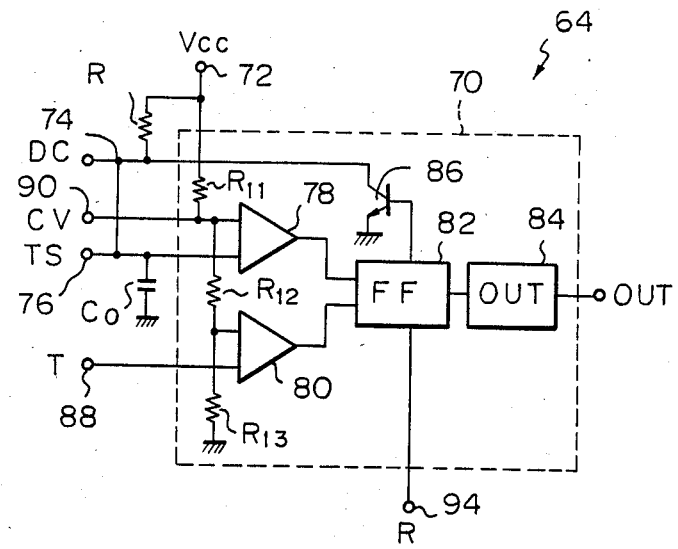
FIG. 5 shows an example of a monostable multivibrator also included in the control system of FIG. 1.

The monostable multivibrator 64 of such a servo amplifier circuit may have the construction illustrated in FIG. 5 by way of example. In FIG. 5, the monostable multivibrator comprises a 555 timer generally denoted by the reference numeral 70. A resistor $R_0$ is connected between a power source terminal 72 and a discharge terminal 74 while a capacitor $C_0$ is connected between a threshold terminal 76 and the ground. The discharge terminal 74 and threshold terminal 76 are interconnected by a shortcircuiting path.

As shown, the 555 timer 70 includes a threshold comparator 78, a trigger comparator 80, a flip-flop circuit 82, an output circuit 84 and a switching transistor 86. The threshold comparator 78 is supplied with a reference voltage which is $\frac{2}{3}$ of the source voltage $V_{cc}$ and the trigger comparator 80 a reference voltage which is $\frac{1}{3}$ of the source voltage $V_{cc}$, the voltage division being performed by resistors $R_{11}$, $R_{12}$, $R_{13}$. When a trigger pulse is fed to the trigger terminal 88, the output OUT becomes high or "H" level and the transistor 86 is turned off to cause the capacitor $C_0$ to be charged by the source voltage $V_{cc}$ via the resistor $R_0$. As the voltage level in the capacitor $C_0$ reaches a control level CV at a control voltage terminal 90, the output OUT becomes low or "L" level while the transistor 86 is turned on to discharge the capacitor $C_0$ rapidly.

The monostable multivibrator 64 having the above design can vary its sweeping time (time period for which the output OUT remains high or "H" level) by varying the threshold voltage by the control voltage CV.

Figure 6:
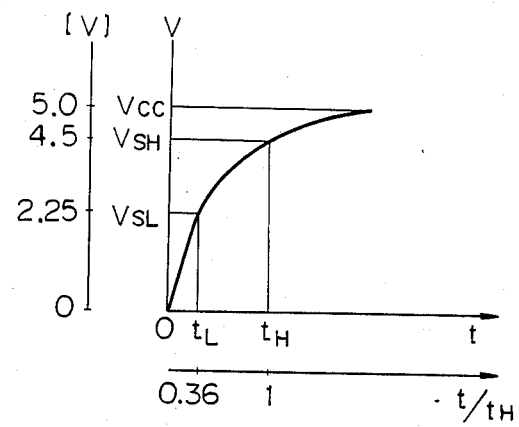
FIG. 6 is a graph demonstrating an operation of the control system.

FIG. 6 is a graph showing the relationship between the output voltage of the integrator constituted by the capacitor $C_0$ and resistor $R_0$ and the threshold voltage and sweeping time of the monostable multivibrator. In the graph, $V_{SH}$ is a maximum value of the threshold voltage, $t_H$ a sweeping time determined by the maximum threshold voltage $V_{SH}$, $V_{SL}$ a minimum value of the threshold voltage, and $t_L$ a sweeping time determined by the minimum threshold voltage $V_{SL}$. It will be seen from the graph that, for a source voltage $V_{cc}$ of 5 V, the threshold voltage is variable within the range of 2.25–4.5 V and the time ratio $t_L/t_H$ is 0.36. Thus, if the control voltage CV varies within the range of 2.25–4.5 V, the threshold voltage can be varied in the same way to in turn vary the sweeping time within the range of $t_L$–$t_H$.

Figure 7:
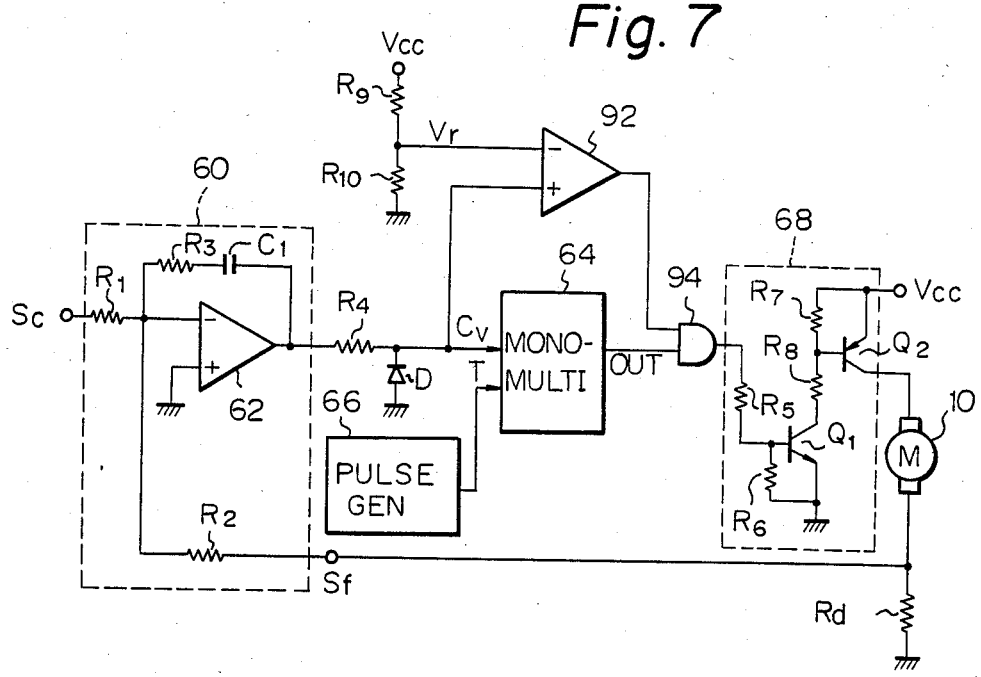
FIG. 7 is a diagram showing an improvement to the servo amplifier circuit shown in FIG. 4.

Referring to FIG. 7, there is shown another embodiment of the present invention which employs a slightly improved version of the switching type servo amplifier circuit described above with reference to FIGS. 4–6.

In the servo amplifier circuit of FIGS. 4–6, the threshold voltage and, therefore, the sweeping time remain the same even if the control voltage CV is lowered beyond the minimum threshold voltage $V_{SL}$. This prevents the output pulse width of the monostable multivibrator from being made shorter than the time period $t_L$, which makes it impossible to lower the average value of the current supply to the motor 10 beyond a predetermined value even when the output voltage of the initial stage servo amplifier 60 drops beyond the level $V_{SL}$. The servo amplifier circuit of FIG. 7 is designed such that it can supply the motor with a current or voltage even lower than a minimum current or voltage which is dependent on the sweeping time. For this purpose, the construction shown in FIG. 7 includes a discrimination circuit for determining whether the control voltage is lower than the minimum value of the threshold voltage. When the control voltage is determined to be lower than the minimum threshold voltage, the control of the switching circuit by the output of the monostable multivibrator is interrupted.

In detail, the servo amplifier circuit of FIG. 7 differs from that of FIG. 4 in that it includes a comparator 92 serving as the discrimination circuit, resistors $R_9$, $R_{10}$ constituting a voltage divider which prepares a reference voltage $V_r$ for the comparator 92, and an AND gate 94. The reference voltage $V_r$ prepared by dividing the source voltage $V_{cc}$ through the resistors $R_9$, $R_{10}$ corresponds to a minimum value (2.25 V in the example described) of the threshold voltage of the monostable multivibrator 64. The comparator 92 is supplied with this reference voltage $V_r$ at its inverting input terminal and the control voltage CV, which is an output of the servo amplifier 60, at its non-inverting input terminal.

With this construction, while the control voltage CV is higher than the reference voltage $V_r$, the output of the comparator 92 remains high or "H" level to keep the AND gate 94 open so that the output of the monostable multivibrator 64 is coupled to the switching circuit 68. Under this condition, the motor 10 is subjected to a control based on pulse width modulation. Upon a drop of the control voltage CV beyond the reference voltage $V_r$, the output of the comparator 92 becomes low or "L" level whereby the AND gate 94 is closed to disconnect the switching circuit 68 from the monostable multivibrator 64. Consequently, the switching circuit 68 has its transistors $Q_1$, $Q_2$ kept non-conductive whereby the average value of the current supply to the motor 10 is reduced. This causes the feedback signal $S_f$ to fall and, therefore, the output of the servo amplifier 60 to rise with the resultant increase in the control voltage CV beyond the reference level $V_r$. Then, the output of the comparator 92 becomes high or "H" level to open the AND gate 94 and thereby re-establish the pulse width modulation control, which increases the current supply to the motor 10. That is, while the control input $S_c$ to the servo amplifier 60 is small, the procedure described above is repeated to feed a small current to the motor 10.

The voltage control range can be enlarged in the same way in the case where the switching type servo amplifier is of a voltage source type.

If desired, the output of the comparator 92 shown in FIG. 7 may be inverted and coupled to the reset terminal of the 555 timer 70 shown in FIG. 5 in order to leave out the AND gate 94. In such a case, an arrangement will be made such that when the control voltage is lower than the minimum threshold voltage, the monostable multivibrator 64 is reset to interrupt the control of the switching circuit 68 which is performed by the output of the monostable multivibrator 64.

In this way, a switching type servo amplifier circuit with the construction of FIG. 7 can control the motor current or motor voltage over an extended range.

Other examples of the servo amplifier circuit applicable to the present invention, particularly a bridge type servo amplifier, will be described hereinafter. First, general construction and operation of a bridge type servo amplifier will be discussed.

A current source bridge type servo amplifier circuit has been widely used for the velocity control of a d.c. motor. As shown in FIG. 8, such a servo amplifier circuit comprises a bridge connection of four switching circuits $SW_1$, $SW_2$, $SW_3$, $SW_4$ which is connected between the positive line V+ and the ground line GND of a d.c. voltage source. A d.c. motor 10 is connected between the balancing points a, b of the four switching circuits $SW_1$–$SW_4$. In response to a control input signal, control signals $s_1$–$s_4$ to the respective switching circuits are controlled such that the switching circuits $SW_1$, $SW_4$ and the switching circuits $SW_2$, $SW_3$ are selectively rendered conductive (allowing the passage of a current). At the same time, the time period or degree of conduction is controlled to control the direction and magnitude of the current flowing through the motor 10.

Figure 10:
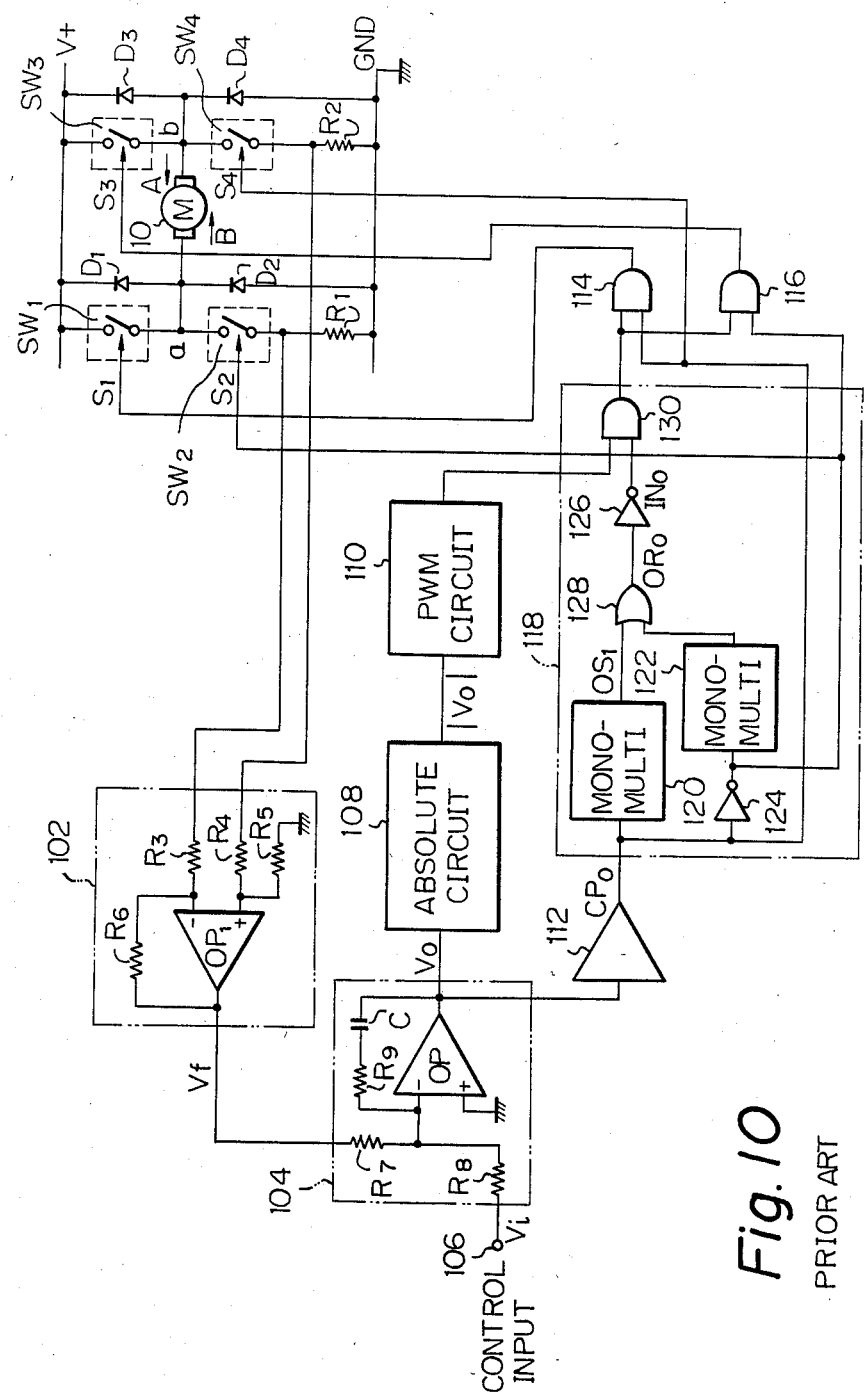
FIG. 10 shows a prior art servo amplifier circuit of the current source bridge type.

The final stage switching circuits $SW_1$–$SW_4$ of such a servo amplifier circuit are constituted by transistors or like semiconductor elements. Due to a delay in switching time, a short mode sometimes occurs in which the switching circuits such as $SW_1$ and $SW_2$ in FIG. 8 become conductive together. In the circuit arrangement of FIG. 8, suppose that the control signals $s_1$, $s_4$ to the switching elements $SW_1$, $SW_4$ have a waveform shown in FIG. 9a and the control signals $s_2$, $s_3$ to the switching elements $SW_2$, $SW_3$ a waveform shown in FIG. 9b. Then, the switching elements $SW_1$, $SW_4$ are made conductive (ON) or non-conductive (OFF) with a delay as viewed in FIG. 9c. Likewise, the switching elements $SW_2$, $SW_3$ are made conductive (ON) or non-conductive (OFF) as shown in FIG. 9d. The result is the possibility of short modes in the hatched time zones of FIGS. 9a–9d. Hence, a current source bridge type servo amplifier of the above construction must be equipped with a circuit for precluding short modes. FIG. 10 illustrates a conventional current source bridge type servo amplifier circuit furnished with such an anti-short mode circuit. In FIG. 10, the same elements as those of FIG. 8 are denoted by the same reference characters and numerals.

The circuitry shown in FIG. 10 includes resistors $R_1$, $R_2$ for generating voltages corresponding to currents which flow through the motor 10 in the directions A and B, respectively. A current detection circuit 102 comprises an operational amplifier $OP_1$, input resistors $R_3$, $R_4$ a ground resistor $R_5$ and a feedback resistor $R_6$. When the current detector 102 is supplied with an output voltage of the resistor $R_1$, it produces a negative voltage corresponding to the input voltage. When the input to the current detector 102 is an output voltage of the resistor $R_2$, it produces a positive voltage corresponding to the input voltage.

A comparator circuit 104 is adapted to compare an output voltage $V_f$ of the current detector 102 with a control input signal (voltage signal) $V_i$ which arrives at an input terminal 106. The output voltage signal $V_o$ of the comparator 104 has a polarity and a magnitude which depend on the relation in magnitude and difference between the voltages $V_f$ and $V_i$. In detail, the voltage signals $V_i$ and $V_f$ which have opposite polarities are added to each other by resistors $R_7$, $R_8$ and the difference is passed to an integration type inverting amplifier made up of an operational amplifier $OP_2$, a resistor $R_9$ and a capacitor C. The inverting amplifier is equivalent in function to a low pass filter. An absolute value circuit 108 is adapted to produce the absolute value $|V_o|$ of an output $V_o$ of the comparator 104. A pulse width modulation circuit 110 serves to produce a pulse signal having a duration or width which corresponds to an output $|V_o|$ of the absolute value circuit 108. A comparator 112 is adapted to identify the polarity of an output signal $V_o$ of the comparator circuit 104; it producing a high level or logical "1" output when $V_o$ is positive and a low level or logical "0" output when otherwise. Depending on the output level of the comparator 112, an AND gates 114 or 116 is opened to pass a pulse width modulated signal from the pulse width modulation circuit 110 to the switching element $SW_1$ or $SW_3$ therethrough.

The reference numeral 118 indicates the circuit for avoiding a short mode and which comprises monostable multivibrators 120, 122, inverters 124, 126, an OR gate 128 and an AND gate 130. As the output $V_o$ of the comparator circuit 104 swings to the positive and negative sides repeatedly, as shown in FIG. 11a, the output $V_o$ of the absolute value circuit 108 is varied as indicated in FIG. 11b while the output $CP_0$ of the comparator 112 is varied as indicated in FIG. 11c. Accordingly, the outputs $OS_1$, $OS_2$ of the monostable multivibrators 120, 122, output $OR_0$ of the OR gate 128 and output $IN_0$ of the inverter 126 are varied along the waveforms shown in FIGS. 11d–11g, respectively. While the output $IN_0$ of the inverter 126 remains low level or logical "0", the AND gate 130 blocks the output pulses of the pulse width modulator 110 and thereby maintains the switching elements $SW_1$, $SW_3$ non-conductive. The circuitry further includes diodes $D_1$–$D_4$ for cancelling inverse voltages which would develop when the switching elements $SW_1$–$SW_4$ are turned off, respectively.

When a positive voltage is supplied as the control input $V_i$ to the input terminal 106 of the servo amplifier circuit shown in FIG. 10, the output voltage $V_o$ of the comparator 104 becomes negative and the output of the comparator 112 "0". This makes the output of the inverter 124 logical "1" to turn on the switching element SW$_2$ and, at the same time, opens the AND gate 116 to supply the output pulse of the pulse width modulator 110 to the switching element SW$_3$ as a control signal. The switching element SW$_3$ is therefore turned on for a time period (duty) corresponding to the width of the input pulse. Then, a current flows through the motor 10 in the direction A driving it forwardly. The current flowing through the motor 10 is detected by the current detector 102 whose output voltage V$_f$ (negative voltage in this case) is fed back to the comparator 104. The comparator 104 causes the pulse width at the pulse width modulator 110 to vary in accordance with the difference between the voltage V$_f$ and the control input V$_i$. Consequently, the conduction time of the switching element SW$_3$ is controlled to in turn control the current flowing through the motor 10, so that the motor 10 is driven for rotation at a velocity which corresponds to the control input to the servo amplifier.

Where the voltage applied as the control input V$_i$ is negative, the output voltage V$_o$ of the comparator 104 is negative and the output CP$_0$ of the comparator 112 logical "1", whereby the switching element SW$_4$ is turned on. At the same time, the output pulse of the pulse width modulator 110 is coupled to the motor 10 which is then driven reversely by a current which now flows in the direction B. At this instant, the output V$_f$ of the current detector 102 is fed back to the comparator 104 as a positive voltage.

In this manner, as long as the control input to the servo amplifier varies on the positive voltage side or the negative voltage side only, the output of the comparator 104 substantially remains negative or positive. However, since the current detector 102 cannot vary its output V$_f$ without a delay in response to a change in the control input to the servo amplifier, the relation in absolute value between the control input V$_i$ and the output V$_f$ of the current detector 102 may become inverted causing the output voltage of the comparator 104 to shift from the negative to the positive or vice versa, as shown in FIG. 11a. Under this condition, the anti-short mode circuit 118 is activated to turn off the switching elements SW$_1$, SW$_3$ for a period of time determined by the monostable multivibrator 120 or 122 and, thereafter, actuate the switching elements SW$_1$-SW$_4$ such that a current opposite in direction flows through the motor 10. Then, the output voltage of the comparator 104 tehds to return to the negative level or the positive level. As the comparator output V$_o$ crosses the zero level, the anti-short mode circuit 118 is again operated to turn off the switching elements SW$_1$, SW$_3$. While the switching elements SW$_1$, SW$_3$ are turned off, the current detector 102 is prevented from detecting a current flowing through the motor 10 with accuracy. In this way, the operation of the anti-short mode circuit adversely affects the ability to follow a control input and the stability of operation. In a reciprocating scanner for example, the degraded following ability and stability would be detrimental to the stability of a constant velocity control.

The bridge type servo amplifier circuit applicable to the present invention constitutes an improvement to such a prior art bridge type servo amplifier and succeeds in achieving an excellent ability to follow a change in the control input.

Figure 12:
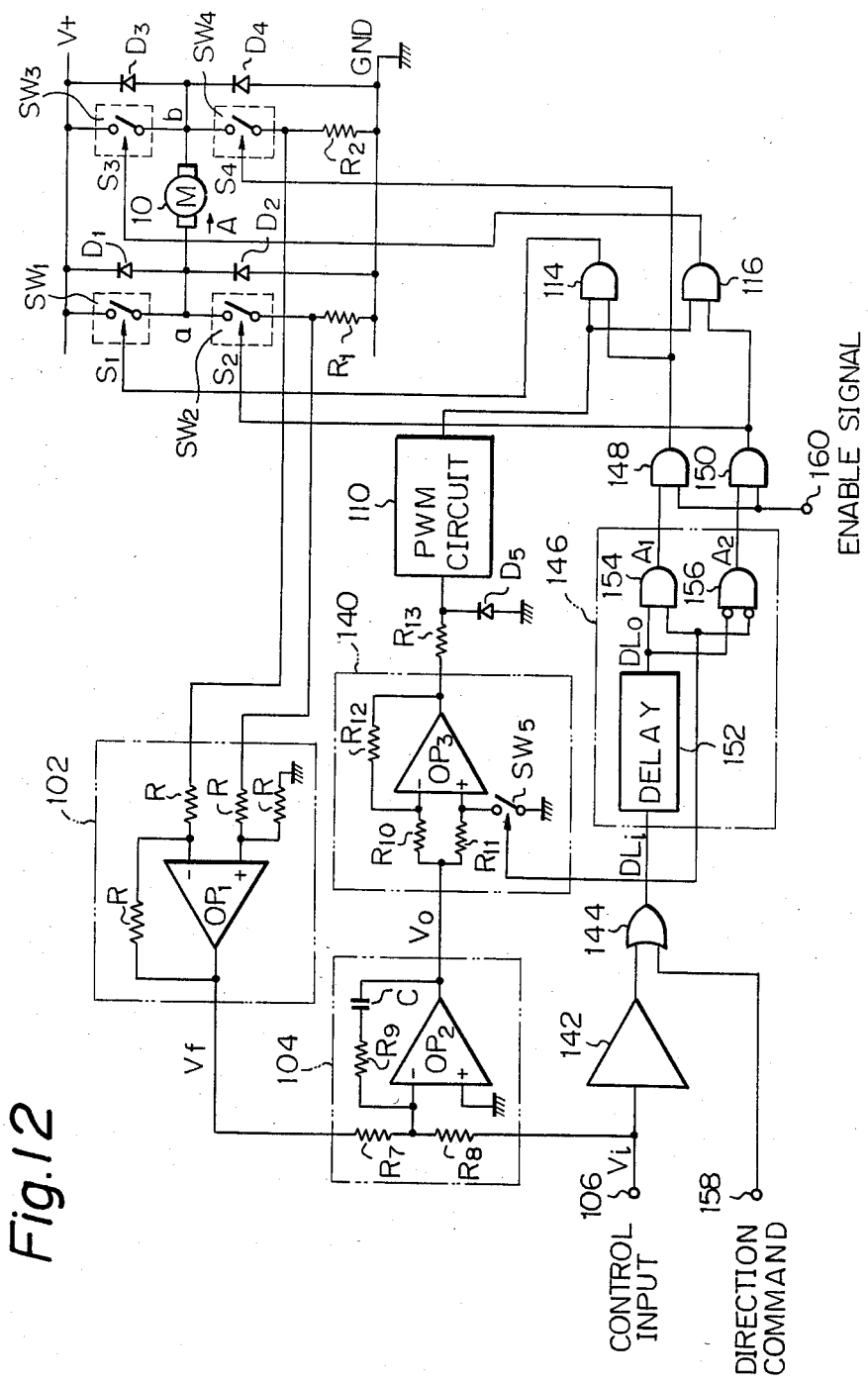
FIG. 12 shows an improvement to the servo amplifier circuit of FIG. 10.

Referring to FIGS. 12–15, an example of the bridge type servo amplifier circuit of the present invention will be described. In FIG. 12 which is a block diagram of the servo amplifier of the invention, the same elements as those of the prior art indicated in FIG. 10 are denoted by the same reference numerals and will not be described any further.

As shown, the output signal V$_o$ of a comparator circuit 104 is coupled to an inverting/non-inverting amplifier 140 the output of which is in turn coupled to a pulse width modulation circuit 110. The amplifier 140 comprises an operational amplifier OP$_3$, input resistors R$_{10}$, R$_{11}$, a feedback resistor R$_{12}$ and a switching element SW$_5$; the construction is such that the amplifier 140 functions as an inverting amplifier when the switching element SW$_5$ is turned on and as a non-inverting amplifier when it is turned off. The switching element SW$_5$ is controlled by an output of a comparator 142 adapted to determine the polarity of a control input V$_i$ to the servo amplifier. When the control input V$_i$ is positive, the output of the comparator 142 is logical "1" to turn on the switching element SW$_5$ via an OR gate 144. When the control input V$_i$ is negative, the output of the comparator 142 is logical "0" which turns off the switching element SW$_5$ via the OR gate 144. A resistor R$_{13}$ and a diode D$_5$ are installed in the servo amplifier in order to clamp an input to the pulse width modulator 110 when the output of the comparator 140 is negative, to a proportion corresponding to a voltage drop in the forward direction of the diode D$_5$.

The output of the comparator 142 passed through the OR gate 144 is coupled to the final stage switching elements SW$_1$-SW$_4$ as a selection signal via an anti-short mode circuit 146, and AND gates 148, 150, 114, 116 adapted to control the operation of the servo amplifier.

The anti-short mode circuit 146 comprises a delay circuit 152, and a positive input AND gate 154 and a negative input AND gate 156 for obtaining AND of an input signal DL$_i$ and an output signal DL$_o$ of the delay circuit. The delay circuit 152 may be constructed as shown in FIG. 13 by way of example. Suppose that the signal input DL$_i$ to the delay circuit 152 from the comparator 142 is varied as shown in FIG. 14a. Then, the delay circuit 152 produces the signal DL$_i$ upon the lapse of a predetermined delay time T$_d$ as indicated in FIG. 14b. The output A$_1$ of the AND gate 154 becomes logical "1" only when both the signals DL$_i$ and DL$_o$ are logical "1" as seen in FIG. 14c, while the output A$_2$ of the AND gate 156 becomes logical "1" only when both the signals DL$_i$ and DL$_o$ are logical "0" as seen in FIG. 14d. Accordingly, for a time period corresponding to the delay time T$_d$, the outputs of the AND gate 154, 156 and, therefore, those of the AND gates 148, 150 commonly remain logical "0" to turn off all the switching elements SW$_1$-SW$_4$, whereby a short mode is prevented which would otherwise occur in the event of a change in the state of the switching elements.

Denoted by the reference numeral 158 is an input terminal for a signal which specifies a direction of rotation of the d.c. motor 10. By making this signal logical "1" level, the motor 10 can be rotated in the forward direction regardless of the output of the comparator 142. Denoted by the reference numeral 160 is an enable signal terminal. The servo amplifier is enabled when the enable signal is logical "1" but disenabled when it is logical "0".

In the servo amplifier circuit constructed as above, a positive voltage coupled thereto as the control input V$_i$ makes the output of the comparator 142 logical "1" level whereby the switching element SW$_5$ of the amplifier 140 is closed to establish an inverting mode. The output $V_o$ of the comparator 104 is negative and, therefore, the output of the amplifier 140 is positive, so that the pulse width modulator 110 produces a pulse signal having a duration corresponding to the magnitude of the positive output of the amplifier 140. Upon the lapse of the delay time of the delay circuit 152, the output of the AND gate 154 becomes logical "1" allowing the output of the AND gate 148 to become logical "1", if the enable signal is logical "1". Then, the switching element SW$_4$ is turned on while the pulse output of the pulse width modulator 110 is coupled to the switching element SW$_1$ via the AND gate 114 so as to control the conduction time thereof. As a result, the motor 10 is supplied with a current in the direction A of FIG. 12 and thereby driven forwardly (opposite to the prior art of FIG. 10 in this embodiment). This current flowing through the motor 10 is detected by the current detector 102 so that a negative voltage $V_f$ is fed back from the current detector to the comparator 104.

Even if the absolute value of the voltage $V_f$ grows larger than that of the control input $V_i$ to change the polarity of the output voltage $V_o$ of the comparator 104 from the negative to the positive, the conditions of the switching elements SW$_1$–SW$_4$ remain the same while the output of the amplifier 140 becomes negative. Consequently, the pulse width modulator 110 is supplied with a relatively low voltage which is clamped by the diode D$_5$. Since the output pulse usually has a given relatively narrow width, the motor 10 is continuously supplied with a relatively small current in the direction A.

It is only when the polarity of the control input $V_i$ is changed from the positive to the negative or vice versa that the conditions of the switching elements SW$_1$–SW$_4$ are altered. At the instant of a change in the control input polarity, the anti-short mode circuit 146 is activated to prevent a short mode and the switching elements SW$_1$–SW$_4$ are actuated to reverse the flow direction of the current through the motor 10. In this way, the servo amplifier circuit of the invention eliminates needless actions of the switching elements and needless operations of the anti-short mode circuit as long as the control input varies only on either one of the positive and negative sides, thereby achieving an excellent ability to follow a change in the control input.

In connection with such a bridge type servo amplifier, use may be made of a circuit constructed as shown in FIG. 15 in order to supply the motor with a predetermined current which is large enough to overcome frictional forces of the scanning mechanism.

The circuit of FIG. 15 comprises an amplifier 180 selectively operable in an inverting mode and a noninverting mode, and an inverting amplifier circuit 182 adapted to add an output voltage of the amplifier 180 to a control input $V_i$. The amplifier 180 includes a switching element SW$_6$ which is tuned on and off by a switching signal SD which is generated in accordance with the scanning direction. For instance, the switching element SW$_6$ may be turned on during a forward stroke of a scanner so that the amplifier 180 functions as an inverting amplifier to invert and amplify a predetermined positive voltage $V_c$ into a negative bias voltage. In this case, the control input $V_i$ for a forward stroke is a negative voltage. This negative voltage and the bias voltage from the amplifier 180 are added to each other by the inverting amplifier circuit 182 whose output is coupled to the input terminal 106 of FIG. 12 as a positive control input $V_i'$.

It will be seen that the bridge type servo amplifier constructed as above in accordance with the invention can perform a control well following a change in a control input coupled thereto and will prove particularly effective when applied to a constant velocity control of a reciprocating mechanism shown in FIG. 1 or the like. Compared to the prior art anti-short mode circuit of FIG. 10, the circuit of the invention shown in FIG. 12 is quite simple in construction since it only requires a delay circuit, and a positive input AND gate and a negative input AND gate for obtaining AND of input and output signals of the delay circuit. While in the embodiment FIG. 12 the switching elements are turned on and off by an output of the pulse width modulator to have a conduction time (duty) which corresponds to a width of the modulator output pulse, it will be apparent that switching elements such as transistors may have their conduction degree controlled in a linear mode by an output of the amplifier 140.

Various modifications will become possible for those skilled in the art after receiving the teachings of the present disclosure without departing from the scope thereof.

What is claimed is:
1. A control system for a reciprocating drive motor comprising:
   loop filter means;
   motor drive circuit means for drivingly energizing the motor in accordance with an output signal of the loop filter means;
   selection circuit means for selecting one of a start mode and a constant velocity control mode;
   reference pulse generator means for generating reference pulses whose period corresponds to a specified velocity;
   rotary encoder means for generating pulses synchronous with the rotation of the motor;
   phase comparator means for comparing the reference pusles with the synchronous pulses in phase to produce an output representing the resultant phase difference;
   charge pump circuit means connected between the phase comparator means and the loop filter means to produce an output voltage in accordance with the phase difference and to produce a zero output voltage when the phase difference is zero; and
   switching means responsive to the selection circuit means for controlling the loop filter means to produce a zero output voltage in the start mode and to produce an output voltage which varies in accordance with the output voltage of the charge pump circuit means in the velocity control mode;
   the charge pump circuit means producing a zero output voltage when the phase difference is zero;
   the motor drive circuit means comprising compensating voltage supply means for supplying the motor with a current large enough to overcome frictional forces of a system driven by the motor during the start mode and the velocity control mode, said predetermined output voltage of the loop filter means being zero;
   the control system further comprising analog feedback motor speed control means controlled by the selection circuit means to be connected to the motor drive circuit means, the control system further comprising means for disconnecting the out- put of the loop filter from the analog motor speed control means in the start mode and connecting the output of the loop filter to the motor drive circuit means in the velocity control mode.

2. A control system as claimed in claim 1, in which the motor drive circuit means comprises a switching type servo amplifier circuit.

3. A control system as claimed in claim 1, in which the motor drive circuit means comprises a bridge type servo amplifier circuit.

4. A control system for a reciprocating drive motor comprising:

loop filter means;

motor drive circuit means for drivingly energizing the motor in accordance with an output signal of the loop filter means;

selection circuit means for selecting one of a start mode and a constant velocity control mode;

reference pulse generator means for generating reference pulses whose period corresponds to a specified velocity;

rotary encoder means for generating pulses synchronous with the rotation of the motor;

phase comparator means for comparing the reference pulses with the synchronous pulses in phase to produce an output representing the resultant phase difference;

charge pump circuit means connected between the phase comparator means and the loop filter means to produce an output voltage in accordance with the phase difference; and switching means responsive to the selection circuit means for controlling the loop filter means to produce a predetermined output voltage in the start mode and to produce an output voltage which varies in accordance with the output voltage of the charge pump circuit means in the velocity control mode;

the control system further comprising analog feedback motor speed control means connected to the motor drive circuit means, the control system further comprising means for combining an output signal from the analog feedback motor speed control means with the output signal from the loop filter means for control of the motor speed in both the start mode and the constant velocity control mode.

5. A control system for a reciprocating drive motor comprising:

selection circuit means for selecting one of a start mode and a constant speed control mode;

a phase locked motor speed control means having first means for producing a phase error output voltage and second means responsive to the selection circuit means and the first means for producing a predetermined output voltage in the start mode and an output voltage which varies in accordance with the phase error output voltage in the constant speed control mode; and analog feedback motor speed control means connected to the phase locked motor speed control means, the control system further comprising means for combining an output voltage from the analog feedback motor speed control means with the output voltage from the second means for control of the motor speed.

6. A motor speed control system as claimed in claim 5, in which the output signal from the analog feedback motor speed control means is combined with the output signal from the second means for control of the motor speed in both the start mode and the constant speed control mode.

* * * * *